United States Patent [19]

Minami et al.

[11] 4,395,519

[45] Jul. 26, 1983

[54] PHYSICALLY BLENDED PROPYLENE POLYMER COMPOSITION

[75] Inventors: Syuji Minami, Ohtake; Norio Kashiwa, Iwakuni; Akifumi Kato; Junichi Watanabe, both of Ohtake, all of Japan

[73] Assignee: Mitsui Petrochemical Industries, Ltd., Tokyo, Japan

[21] Appl. No.: 196,550

[22] Filed: Oct. 14, 1980

Related U.S. Application Data

[63] Continuation of Ser. No. 31,298, Apr. 18, 1979, abandoned.

[51] Int. Cl.³ .................. C08L 23/16; C08L 23/12; C08L 23/06
[52] U.S. Cl. ................... 525/240; 525/75; 525/70
[58] Field of Search ............................ 525/240

[56] References Cited

U.S. PATENT DOCUMENTS

| | | | |
|---|---|---|---|
| 3,998,911 | 12/1976 | Strametz et al. | 260/878 B |
| 4,059,651 | 11/1977 | Smith | 260/848 |
| 4,078,131 | 3/1978 | de Zarauz | 526/20 |
| 4,087,485 | 5/1978 | Huff | 260/897 A |
| 4,087,486 | 5/1978 | Fielding | 260/897 A |
| 4,128,606 | 12/1978 | Furutachi et al. | 260/878 B |
| 4,140,732 | 2/1979 | Schnetger et al. | 260/876 B |

*Primary Examiner*—Carman J. Seccuro
*Attorney, Agent, or Firm*—Sherman & Shalloway

[57] ABSTRACT

A physically blended propylene polymer composition composed of
 (A) 100 parts by weight of crystalline polypropylene containing 0 to 10 mole % of ethylene and/or another α-olefin,
 (B) 1 to 30 parts by weight of a propylene/ethylene random copolymer composed of 30 to 85 mole % of propylene, said copolymer containing 0 to 10 mole % of a diene component and having (i) a micro-isotacticity of at least 0.8 and (ii) a boiling n-cyclohexane insolubles content of 0 to 10% by weight, and
 (C) 0 to 30 parts by weight of polyethylene containing 0 to 15 mole % of an α-olefin,
said components (A) and (B) having been physically mixed with each other.

5 Claims, No Drawings

PHYSICALLY BLENDED PROPYLENE POLYMER COMPOSITION

This is a continuation of application Ser. No. 031,298, filed Apr. 18, 1979, now abandoned.

This invention relates to a physically blended propylene polymer composition having superior properties such as impact strength, rigidity, gloss and a high degree of uniformity in the mixing and a high degree of dispersion of the ingredients in the resulting polymer composition.

More specifically, the invention relates to a physically blended propylene polymer composition composed of (A) 100 parts by weight of crystalline polypropylene containing 0 to 10 mole % of ethylene and/or another α-olefin, (B) 1 to 30 parts by weight of propylene/ethylene random copolymer composed of 30 to 85 mole% of propylene, said copolymer containing 0 to 10 mole% of a diene component and having (i) a micro-isotacticity of at least 0.8 and (ii) a boiling n-cyclohexane insolubles content of 0 to 10% by weight, and (C) 0 to 30 parts by weight of polyethylene containing 0 to 15 mole% of an α-olefin, said components (A) and (B) having been physically blended with each other.

Although crystalline polypropylene produced by using stereoregular catalysts has superior rigidity and thermal stability, it suffers from low impact strength particularly at low temperatures, and this disadvantage limits its uses.

In an attempt to overcome the disadvantage, suggestions have been made heretofore to produce physically blended polymer compositions by mixing polypropylene with polyethylene and/or an ethylene/propylene copolymer (for example, Japanese patent publication No. 7088/60; U.S. Pat. No. 3,256,367; Japanese patent publication No. 7345/66; and German Pat. No. 1,694,914 corresponding to Japanese patent publication No. 23416/70). With physically blended polymer compositions obtained by physical blending means, such as comprising first preparing different polymers or copolymers and then blending them physically, however, it is difficult to attain such a high degree of uniformity in the mixing and a high degree of dispersion of the ingredients in the resulting polymer compositions as can be done with chemically blended polymer compositions obtained by the chemical means, multi-step polymerization.

Also, physically blended polymer compositions as suggested above cannot avoid incident deterioration in the desirable properties of polypropylene itself although they do bring about some improvement in the impact resistance of the resulting polymer composition. The so far suggested physically blended polymer compositions, in particular, have had difficulty in affording a preferred balance between high impact strength and high rigidity. In addition, the physically blended polymer compositions have invited the trouble that their gloss is remarkably poor compared with that of polypropylene. Furthermore, none of said proposals for physically blended polymer compositions disclose the utilization of a carrier-supported titanium catalyst component, such as a carrier-supported titanium catalyst component containing at least magnesium, halogen and titanium, preferably together with a donor such as an organic acid ester.

In order to overcome the drawbacks and disadvantages experienced in physically blended polymer compositions that a uniform mixture is hard to obtain and that a preferred balance between high impact strength and high rigidity is difficult to afford, some suggestions have been made to provide chemically blended polymer compositions by the means of multi-step polymerization process.

A first suggestion of the chemically blended polymer composition is disclosed in Japanese patent publication No. 20621/69 which relates to the production of a polymer composition having improved impact strength at low temperatures by forming a polymer composed substantially of propylene or a propylene/ethylene copolymer, then forming a propylene-rich propylene/ethylene copolymer, and further forming an ethylene-rich ethylene/propylene copolymer, all the reactions being performed in the presence of a stereoregular catalyst composed of (a) a titanium trichloride composition obtained by reducing $TiCl_4$ with metallic aluminum and (b) an organoaluminum compound. In order to achieve a further improvement, another suggestion was later made (Japanese patent publication No. 24593/74) in which a polymer composition improved over the composition obtained in the first suggestion is prepared using the same catalyst as in the first suggestion by first forming polypropylene, then forming an ethylene-rich ethylene/propylene copolymer, and then forming an ethylene/propylene copolymer having a higher ethylene content. A third suggestion, similar to the second one, was also made (Japanese patent publication No. 30264/74) which involves using the same catalyst as in the first and second suggestions, and first forming polypropylene in the presence of a chain-transfer agent, then forming an ethylene-rich ethylene/propylene copolymer, and finally forming polyethylene or an ethylene/propylene copolymer having a higher ethylene content. A fourth suggestion, similar to the third, is also known (DT-PS 2,417,093).

None of these first to fourth suggestions of the chemically blended polymer composition disclose the utilization of a carrier-supported titanium catalyst component.

Additional suggestions for providing the chemically blended polymer composition are known from DT-OS No. 2,700,774 (corresponding to U.S. Pat. No. 4,128,606) and DT-OS 2,801,217. These suggestions have the technical idea that physically blended polymer compositions should be avoided, and on the basis of this technical idea, teach the production of chemically blended polymer compositions by 3-step polymerization using a catalyst composed of (a) a carrier-supported titanium catalyst component containing at least magnesium, halogen and titanium, preferably together with an organic acid ester, on the surface of the carrier and (b) an organoaluminum compound.

These chemically blended polymer compositions have the advantage that their rigidity and impact strength are high and well balanced, as compared with the aforementioned physically blended polymer compositions, and the advantage that a high degree of uniformity can be obtained which has been difficult to attain with the conventional physically blended polymer compositions. The chemically blended polymer compositions, however, have been found to involve the following shortcomings.

In the production of the chemically blended polymer composition, reaction products containing the desired polymer composition are obtained in such a state as to contain a solid polymer composition in a polymerization solvent, after the final step of the multi-step polymerization has been completed, and then, the solid polymer composition is separated and recovered from the reaction products, whereby the polymer composition desired is isolated. In this case, the propylene/ethylene random copolymer (B) as specified in the present invention can dissolve in a non-negligible amount in the polymerization solvent, thus producing the disadvantage that upon said separation and recovery, part of the random copolymer remains dissolved in the liquid phase, causing a loss of the random copolymer content of the final product.

Furthermore, the reactions in the multiplicity of steps of the multi-step polymerization are complicated to control. Even when this control has been made carefully to obtain a final product of a predetermined composition, the least deviation of the reaction conditions that could occur in each step would cause increased deviation to the predetermined composition. Because of these facts affecting each other, and partly because of the aforementioned loss of the random copolymer, it is difficult to afford the final product of the predetermined composition with high reproducibility.

If, in the propylene/ethylene random copolymer forming step, this copolymer is formed in a large amount in an attempt to obtain a final composition having a relatively high content of said copolymer, then there will be the operational trouble that the viscosity of the reaction mixture will increase, making a smooth execution of the multi-step polymerization difficult. There will also be the disadvantage that the resulting chemically blended polymer composition often has poor gloss.

We have made studies to provide physically blended polymer compositions which have overcome the above-described drawbacks experienced in chemically blended polymer compositions and which at the same time, have overcome the shortcomings of the conventional physically blended polymer compositions, such as difficulty in affording a preferred balance between high impact strength and high rigidity, inferiority in gloss, and difficulty of formation of homogeneous blends.

As a result, we have found that a physically blended propylene polymer composition formed by mixing, by physical means, crystalline polypropylene with a specific amount of a propylene/ethylene random copolymer having a propylene content in a specific range and satisfying two characteristic properties, i.e. a specific micro-isotacticity and a specific boiling n-cyclohexane insolubles content, said composition optionally further containing up to a specific maximum amount of polyethylene, is a composition overcoming the defects of both the known chemically blended polymer compositions and the conventional physically blended polymer compositions and having the merits of both of them which have so far been unable to be satisfied at the same time.

An object of the present invention, therefore, is to provide a physically blended propylene polymer composition composed of crystalline polypropylene and propylene/ethylene random copolymer and optionally further containing polyethylene, said composition having markedly improved properties.

Said object and many other objects, as well as advantages, of the present invention will become apparent from the following disclosure.

In the physically blended propylene polymer composition of the present invention, containing crystalline polypropylene (A) containing 0 to 10 mole% of ethylene and/or another $\alpha$-olefin, said another $\alpha$-olefin may, for example, include $\alpha$-olefins having 4 to 10 carbon atoms, such as 1-butene, 1-hexene, 4-methylpentene-1, 3-methylpentene-1, or 1-octene.

Said crystalline polypropylene (A) should preferably have an isotacticity, expressed in the boiling n-heptane insolubles content, of 90% by weight or more, more preferably of 93% by weight or more, in the case of a propylene homopolymer; in the case of a copolymer of propylene with ethylene and/or another $\alpha$-olefin, the isotacticity is 75% by weight or more, preferably 85% by weight or more. Such crystalline polypropylene is commercially available, and can be prepared by a method known per se, such as a method comprising polymerizing or copolymerizing propylene or propylene with up to 10 mole% of ethylene and/or another $\alpha$-olefin in the presence of a stereoregular catalyst composed of a titanium catalyst component, which may contain electron donors such as esters, ethers, or alcohols, and an organometallic compound catalyst component.

As said organometallic compound can be employed an organometallic compound of a metal of the Group I to III of Mendelejeff's periodic table (short period), and preferably, an organoaluminum compound can be used. As said titanium catalyst component can be utilized titanium trihalides such as titanium trichloride, preferably, titanium trichloride which has been obtained by reducing titanium tetrahalides, such as titanium tetrachloride, with metallic aluminum, hydrogen, or organoaluminum compounds. Preferred as the resulting catalyst is that comprising a carrier-supported titanium catalyst component composed of magnesium, halogen and titanium on the surface of the carrier, and an organoaluminum compound. The carrier-supported catalyst component may be any one which contains at least magnesium, halogen and titanium on the surface of the carrier, and which, if desired, has been treated with a donor and/or an active hydrogen-containing compound. The carrier-supported catalyst component preferably has a specific surface area of not less than 100 m$^2$/g. Preferably, the carrier-supported titanium catalyst component has been treated with a donor such as an organic carboxylic acid ester, particularly an aromatic carboxylic acid ester. In other words, it is convenient to use a carrier-supported titanium catalyst component containing at least magnesium, halogen and titanium on the surface of the carrier and treated with an organic carboxylic acid ester, particularly an aromatic carboxylic acid ester.

A number of prior suggestions have been known in regard to the preparation of such a carrier-supported titanium catalyst composition (see, for example, DT-PS Nos. 2,153,520, DT-PS 2,230,672, DT-PS 2,230,728, DT-PS 2,230,752, DT-PS 2,504,036, NL 75.10394, DT-PS 2,605,922, and Japanese laid-open patent publications Nos. 126590/74, 20297/76, 28189/76, 57789/76 and 151691/77). Several embodiments of producing the carrier-supported titanium catalyst component containing at least magnesium, halogen and titanium on the surface of the carrier and treated with an organic carboxylic acid ester are given below.

(1) A magnesium halide, preferably magnesium chloride or magnesium bromide, and an organic carboxylic acid, preferably an aromatic carboxylic acid ester, are mechanically pulverized in the absence or presence of a small amount of a liquid inert diluent, a silicon compound, or an aluminum compound, and the pulverized product is reacted with a titanium halide, preferably titanium tetrachloride, with or without treatment with an organoaluminum compound.

(2) An organic complex between magnesium and aluminum or silicon which contains a halogen atom and an alkoxy group is reacted with an organic carboxylic acid ester, preferably an aromatic carboxylic acid ester, and the reaction product is further reacted with a titanium compound, preferably titanium tetrachloride.

(3) The product obtained in (1) or (2) is further reacted with an organic carboxylic acid ester, preferably an aromatic carboxylic acid ester, and a titanium compound, preferably titanium tetrachloride.

(4) The product obtained in (1) or (2) is further reacted with an organic carboxylic acid ester, preferably an aromatic carboxylic acid ester, a titanium compound, preferably titanium tetrachloride, and an organoaluminum compound.

Titanium in the titanium complex produced by using titanium tetrachloride in the embodiments (1), (2) and (3) above is tetravalent in most cases. When titanium tetrachloride is used in method (4), titanium in the titanum complex is in most cases a mixture of tetravalent titanium and trivalent titanium, although it may differ according to the amount of the organoaluminum compound to be reacted.

The organic carboxylic acid ester used in the above embodiments may, for example, be (i) aliphatic carboxylic acid esters and halogenated aliphatic carboxylic acid esters, or (ii) aromatic carboxylic acid esters.

Aliphatic carboxylic acid esters or halogenated aliphatic carboxylic acid esters (i) usually employed are esters formed between saturated or unsaturated aliphatic carboxylic acids containing 1 to 8 carbon atoms, preferably 1 to 4 carbon atoms, or halogen-substituted products thereof, and saturated or unsaturated aliphatic primary alcohols containing 1 to 8 carbon atoms, preferably 1 to 4 carbon atoms, saturated or unsaturated alicyclic alcohols containing 3 to 8 carbon atoms, preferably 5 or 6 carbon atom, phenols containing 6 to 10 carbon atoms, preferably 6 to 8 carbons, or aliphatic saturated or unsaturated primary alcohols containing 1 to 4 carbon atoms bonded to alicyclic or aromatic rings containing 3 to 10 carbon atoms.

Aromatic carboxylic acid esters (ii) generally employed are esters formed between aromatic carboxylic acids containing 7 to 12 carbon atoms, preferably 7 to 10 carbon atoms, and saturated or unsaturated aliphatic primary alcohols containing 1 to 8 carbon atoms, preferably 1 to 4 carbon atoms, phenols containing 3 to 8 carbon atoms, preferably 6 to 8 carbon atoms, or aliphatic saturated or unsaturated primary alcohols containing 1 to 4 carbon atoms bonded to alicyclic or aromatic rings containing 3 to 10 carbon atoms.

Specific examples of the aliphatic carboxylic acid esters (i) include alkyl esters of saturated fatty acids such as methyl formate, ethyl acetate, n-amyl acetate, 2-ethylhexyl acetate, n-butyl formate, ethyl butyrate or ethyl valerate; alkenyl esters of saturated fatty acids such as vinyl acetate or allyl acetate; and primary alkyl esters of unsaturated fatty acids such as methyl acrylate, methyl methacrylate or n-butyl crotonate.

Specific examples of the aromatic carboxylic acid esters (ii) are alkyl esters of benzoic acid such as methyl benzoate, ethyl benzoate, n-propyl benzoate, n- or i-butyl benzoate, n- or i-amyl benzoate, n-hexyl benzoate, n-octyl benzoate or 2-ethylhexyl benzoate; alkyl esters of toluic acid such as methyl toluate, ethyl toluate, n- or i-butyl toluate, or 2-ethylhexyl toluate; alkyl esters of anisic acid such as methyl anisate, ethyl anisate or n-propyl anisate; and primary alkyl esters of naphthoic acid such as methyl naphthoate, n-propyl naphthoate, n-butyl naphthoate, or 2-ethylhexyl naphthoate.

The aromatic carboxylic acid esters are preferred among them. Especially preferred aromatic carboxylic acid esters are $C_{1-8}$ alkyl esters of monocyclic aromatic carboxylic acids such as methyl benzoate, ethyl benzoate, methyl p-toluate, ethyl p-toluate, methyl p-anisate, and ethyl p-anisate.

The liquid inert diluent used in the above embodiments may include, for example, hydrocarbons, halogenated hydrocarbons and carbon halides which are liquid at room temperature. Specific examples include aliphatic hydrocarbons such as n-pentane, iso-pentane, n-hexane, iso-hexane, n-heptane, n-octane, 2-ethylhexane, n-decane, and kerosene; alicyclic hydrocarbons such as cyclopentane, cyclohexane; and methyl cyclohexane; aromatic hydrocarbons such as benzene, toluene, xylene, ethylbenzene, cumene, cymene, mesitylene, pseudocumene, and butylbenzene; halogenated hydrocarbons such as methylene chloride, ethyl chloride, ethylene chloride, trichloroethylene, chlorobenzene, n-propyl chloride, iso-propyl chloride and chloroform, and carbon halides such as carbon tetrachloride.

The organoaluminum compound used in the above embodiments include, for example, compounds of the formula $R'_{3-m}AlX_m$ wherein $R'$ is a hydrogen atom, or an alkyl or aryl group, X is a halogen atom, and m is 0 or a positive number of less than 3, compounds of the formula $R'_{3-n}Al(OR)_n$ wherein R is an alkyl or aryl group, $R'$ is as defined above, and n is a positive number greater than 0 but less than 3, and compounds of the formula $RAl(OR)X$ wherein R and X are as defined above. Examples are trialkyl aluminums, alkyl aluminum halides such as alkyl aluminum dihalides, dialkyl aluminum halides, alkyl aluminum sesquihalides, alkyl aluminum hydrides, and alkyl aluminum alkoxides. Specific examples are triethyl aluminum, diethyl aluminum hydride, tripropyl aluminum, tributyl aluminum, diethyl aluminum chloride, diethyl aluminum bromide, diethyl aluminum ethoxide, diethyl aluminum phenoxide, ethyl aluminum ethoxychloride, ethyl aluminum sesquichloride, diethyl aluminum ethoxide and ethyl aluminum diethoxide.

In the process of this invention, the reactions for forming the desired polymer compositions are carried out in the presence of the catalyst described hereinabove which is composed of a carrier-supported titanium catalyst component containing at least magnesium, halogen and titanium on the surface of the carrier and an organoaluminum compound.

Examples of the organoaluminum compound used in preparing this catalyst are trialkyl aluminums, dialkyl aluminum halides, alkyl aluminum sesqihalides or alkyl aluminum dihalides containing an alkyl group with 1 to 12 carbon atoms. The use of the trialkyl aluminums is preferred. Examples of suitable organoaluminum compounds include $(C_2H_5)Al$, $(i-C_4H_9)_3Al$, $(n-C_4H_9)Al$, $(CH_3CH(CH_3)\ CH_2CH_2CH_3)_3Al$, $(C_{12}H_{25})_3Al$ and $(C_2H_5)_2AlOAl(C_2H_5)_2$.

Polymerization of crystalline polypropylene (A) containing 0 to 10 mole% of ethylene and/or another α-olefin can be carried out in the presence of a stereoregular catalyst composed of a titanium catalyst component which may contain an electron donor and an organometallic compound catalyst component that has been exemplified above. Usually the polymerization is performed in the presence of a polymerization solvent, but may be carried out in its absence. Examples of such a polymerization solvent include pentane, hexane, heptane, and kerosene.

The polymerization may be carried out at a temperature of from room temperature to about 90° C., preferably about 20° C. to about 80° C., and at a pressure of from atmospheric pressure to about 40 kg/cm² gauge pressure, preferably about 3 to about 15 kg/cm² gauge pressure.

The polymerization may be performed in the presence of an organic carboxylic acid ester, preferably an aromatic carboxylic acid ester. The same esters as exemplified hereinabove with regard to the production of the carrier-supported titanium catalyst component can be used as the organic carboxylic acid esters for this purpose. These esters serve to increase the proportion of a highly stereoregular polymer formed, when the polymerization is carried out in the presence of hydrogen as a chain-transfer agent. The introduction of the carrier-supported titanium catalyst component, the organometallic compound catalyst component, preferably the organoaluminum compound catalyst component, and the organic carboxylic acid ester into the reaction zones and the mixing of them may be performed in any desired sequence. The amount of the free organic carboxylic acid ester used is, for example, not more than about 1 mole, preferably about 0.01 to about 0.5 mole, per aluminum atom of the organoaluminum compound in the catalyst.

The preferred concentration of the catalyst is such that the amount of the titanium catalyst component is about 0.01 to about 10 millimoles liter calculated as the titanium atom, and the amount of the organoaluminum compound is about 0.01 to about 30 millimoles/liter, both based on the volume of the solvent. Hydrogen is most preferred as a chain transfer agent. The use of chain transfer agents is not essential, however. The amount of hydrogen as a chain transfer agent is up to about 20 mole% based on the monomers fed to the polymerization vessel.

In the present invention, the propylene/ethylene random copolymer (B) composed of 30 to 85 mole%, preferably 40 to 80 mole%, more preferably 50 to 80 mole%, of propylene and optionally containing 0 to 10 mole% of a diene component such as ethylidenenorbornene, dicyclopentadiene, or 1,4-hexadiene and also having the following two characteristic properties
(i) a micro-isotacticity of at least 0.8, preferably at least 0.9, more preferably above 0.9, and
(ii) a boiling n-cyclohexane insolubles content of 0 to 10% by weight, preferably 0 to 5% by weight, particularly preferably no such content,
is used in an amount of 1 to 30 parts by weight, preferably 3 to 20 parts by weight, per 100 parts by weight of the crystalline polypropylene (A).

If the amount used of the propylene/ethylene random copolymer (B) (a name excluding block or graft copolymers) is less than said lower limit, the resulting polymer composition will have superior rigidity but low impact strength. If the amount exceeds said upper limit, the impact strength of the resulting polymer composition is high but its rigidity low.

If the propylene content of said random copolymer is too low compared with its specified range, the resultant polymer composition will have excellent impact strength and excellent rigidity but pose problems such as poor gloss, uneven color, or sink marks on the surface. The use of said random copolymer having a much higher propylene content than its specified range will afford a polymer composition having superior rigidity but low impact strength.

It is also essential in the present invention that the propylene/ethylene random copolymer (B) satisfy the aforesaid two characteristic properties (i) and (ii) while satisfying a combination of the aforementioned two conditions, i.e. its blend amount based on the crystalline polypropylene (A) and its propylene content. Failure to satisfy any of the characteristic properties (i) and (ii) under the above combination conditions would result in the difficulty of affording a physically blended polymer composition having excellent homogeneity, a good balance of high rigidity and high impact strength, and satisfactory gloss.

The micro-isotacticity of the propylene/ethylene random copolymer (B) in the present invention refers to a value determined by the method described below.

Micro-isotacticity

The $^{13}$C nuclear magnetic resonance spectrum of the propylene/ethylene random copolymer (B) showed the appearance of divided signals (isotactic structure, syndiotactic structure, heterotactic structure) due to the stereoregularity of the methine carbon atoms of three or more consecutive propylene chain segments present in the random copolymer (B). Then, the micro-isotacticity was calculated from the following equation.

$$\text{Micro-isotacticity} = \frac{\text{Iso}}{\text{Iso} + \text{Syndio} + \text{Hetero}}$$

wherein Iso, Syndio and Hetero represent the area of the peak of the signal corresponding to the isotactic structure, syndiotactic structure, and heterotactic structure, respectively.

In the present invention, the boiling cyclohexane isolubles content of the propylene/ethylene random copolymer (B) refers to a value determined by the method described below.

Boiling cyclohexane insolubles content

Fine particles of the random copolymer (B), each measuring about 1 mm×1 mm×1 mm, and glass beads, each about 1 mm×1 mm×1 mm in size, were placed in a cylindrical glass filter (G3), and extrcted with cyclohexane by Soxhlet's extractor for 14 hours at the boiling point of the cyclohexane. In this case, the solvent was refluxed at a rate of one time per 5 minutes. After the extraction, the weight of the dissolved portion or the weight of the insoluble portion was measured, and the boiling cyclohexane insolubles content was calculated from the results as weight percent.

The boiling n-heptane insolubles content of the crystalline polypropylene (A) in the present invention refers to a value determined by the same method as described above except that the glass beads were not used; n-heptane was used instead of the cyclohexane; a cylindrical filter paper was used instead of the cylindrical glass filter; and the extraction time was 6 hours.

The propylene/ethylene random copolymer (B) having a specific propylene content and having the two characteristic properties (i) and (ii) used in the present invention can be prepared by using a catalyst selected from among the catalysts for α-olefin polymerization or copolymerization that have been known so far. That is, the random copolymer (B) can be prepared by using a catalyst composed of a carrier-supported solid titanium catalyst component which contains magnesium, halogen, titanium and an electron donor, preferably an organic carboxylic acid ester and which preferably has a specific surface area (as measured by the BET method) of not less than 100 m$^2$/g, and an organoaluminum compound catalyst component, said catalyst being selected from the stereoregular catalysts composed of a titanium catalyst component which may contain an electron donor and an organometalic compound catalyst component that have been exemplified earlier with regard to the production of the crystalline polypropylene (A). Such a catalyst has already been described, for instance, in the items (1) to (4), by quoting DT-PS 2,153,520 and many other known literatures.

When there is used, for example, a catalyst containing a titanium catalyst component of the non-carrier-supported titanium trihalide (such as titanium trichloride) type that has been obtained by reducing a titanium tetrahalide, such as titanium tetrachloride, with metallic aluminum, hydrogen, or an organoaluminum compound, the resulting propylene/ethylene random copolymer (B) has a boiling n-cyclohexane insolubles content, as the characteristic property (ii), of about 20% by weight or more and its composition is ununiform; moreover, the random copolymer (B) is hard to blend homogeneously with the crystalline polypropylene (A) and the resulting polymer composition has poor balance of high rigidity and high impact strength, and unsatisfactory gloss.

When there is used, for example, a catalyst composed of a vanadium catalyst component and an organoaluminum compound catalyst component, a catalyst most frequently used in preparation of a propylene/ethylene random copolymer, the resulting random copolymer has a micro-isotacticity, as the characteristic property (i), of too small a value, usually not more than 0.6. Such random copolymer is also hard to blend homogeneously with the crystalline polypropylene (A), thus providing inferior results such that the rigidity and impact strength of the resulting polymer composition are high but in poor balance and the gloss of the composition is unsatisfactory.

Means for preparing the propylene/ethylene radom copolymer with the use of the above-mentioned specific catalyst may in itself be any known means and may be practiced under the same polymerization conditions as exemplified with regard to the production of the crystalline polypropylene (A).

The propylene/ethylene random copolymer (B) in the present invention should preferably have an intrinsic viscosity (η), as measured in decalin at 135° C., of about 1 to 15, preferably about 1.5 to 13.5. It is also preferred that the random copolymer (B) have a melting point, determined by a differential scanning calorimeter (DSC), of not higher than about 130° C., preferably from about 30° to about 120° C. and have a Shore hardness of 40 to 97, preferably 50 to 90.

The physically blended propylene polymer composition of the present invention may contain, in addition to the crystaline polypropylene (A) and the propylene/ethylene random copolymer (B), up to 30 parts by weight, preferably up to 15 parts by weight, for example 1 to 15 parts by weight, of polyethylene containing 0 to 15 mole% of an α-olefin. Examples of the α-olefin other than ethylene which may be contained in an amount of up to 15 mole% are α-olefins having 3 to 10 carbon atoms, such as propylene, 1-butene, 4-methylpentene-1, 1-hexene, or 1-octene. Methods for preparing such polyethylene which may contain an α-olefin other than ethylene are well known, and the polyethylene is available in the market. The polyethylene may be any one which has been produced by a high pressure method, a moderate pressure method, or a low pressure method, but the preferred polyethylene has a density of 0.90 to 0.98 g/cm$^3$, and the particularly preferred one has a density of 0.94 to 0.98 g/cm$^3$. The intrinsic viscosity, measured in decalin at 135° C., of the polyethylene is preferably 1.0 to 10, more preferably 2.0 to 6.0.

If the amount of the polyethylene (C) added is too much in excess of the aforesaid maximum amount, there will be obtained a polymer composition having increased impact strength, but decreased rigidity and poor gloss.

The physically blended propylene polymer composition of the present invention may further contain various additives in customary use. Examples of such additives include antioxidants such as tetrakis(methylene(3,5-di-tert.butyl-4-hydroxy)hydrocinnamate)methane, tri(mono- or di-norylphenyl)phosphite, or 2,6-di-tert.butyl p-cresol; ultraviolet light absorbers such as 2 (2'-hydroxy-3'-tert.butyl-5'-methylphenyl)-5-chlorobenzotriazole, or bis(2,2,6,6-tetramethyl-4-piperidyl)sebacate; lubricants such as calcium stearate, or synthetic hydrotalcite; nucleating agents such as aluminum hydroxy-di-para-tert-butylbenzoate, or aluminum benzoate; antistatic agents such as stearyl monoglyceride; flame retardants such as ethylenebis(tris-(2-cyanoethyl)-phosphoniumbromide), ammonium polyphosphate, or antimony trioxide; colorants such as isoindolenone type colorants, quinacridone type colorants, cyanine type colorants, or carbon black; and inorganic or organic fillers such as talc, calcium carbonate, barium sulfate, or mica.

The amount of these additives used can be selected suitably, but if an example is taken, it is about 0.05 to about 0.8 weight % for the antioxidant, about 0.05 to about 0.5 weight % for the ultraviolet light absorber, about 0.05 to about 0.5 weight % for the lubricant, about 0.05 to about 0.5 weight % for the nucleating agent, about 0.1 to about 0.8 weight % for the antistatic agent, about 5 to about 30 weight % for the flame retardant, about 0.3 to about 2 weight % for the colorant, or about 5 to about 50 weight % for the filler, all these proportions being based on the total weight of said components (A), (B) and (C).

By mixing the crystalline polypropylene (A), the propylene/ethylene random copolymer (B), and the polyethylene (C), as well as the additive, by suitable means, the physically blended propylene polymer composition of the present invention can be formed.

Examples of such mixing means will be taught in the description and embodiments given below.

In the present invention, the component (A) and the component (B) are physically mixed together. The component (C) may be the one already chemically mixed with the component (A); for instance, the component (C) may be a chemically blended mixture obtained by forming the component (A) through multi-step polymerization system, and then forming the component (C) in the presence of the component (A).

Alternatively, the components (B) and (C) that have been synthesized separately are first mixed together, and then the mixture is mixed with the component (A); or it is also possible to mix together the components (A), (B) and (C) which have been synthesized separately.

The mixing is carried out, for example, by a method comprising stirring the respective components thoroughly by a Henschel mixer, and then blending and pelletizing them on a single-screw or twin-screw extruder.

According to the present invention, there can be provided a physically blended propylene polymer composition having satisfactory gloss, as well as a good balance of high impact strength and high rigidity, such as expressed in a falling dart strength (FD) of about 130 to about 200 kg.cm (0° C.), an initial flexural modulus (FM) of about 11 to about $17 \times 10^{-3}$ kg/cm$^2$, and a gloss of about 50 to about 75.

Several embodiments of the present invention will be described in greater detail with reference to the examples.

EXAMPLE 1

(Preparation of a carrier-supported titanium catalyst component)

30 Grams of commercially available anhydrous magnesium chloride, 7.5 ml of ethyl benzoate, and 4.5 ml of methylpolysiloxane (viscosity: 20 C.S. at 25° C.) were contacted together for 40 hours in an atmosphere of nitrogen by a vibratory mill. 20 Grams of the resulting solid product was suspended in 200 ml of TiCl$_4$, and stirred for 2 hours at 80° C. After the reaction was complete, the supernatant was decanted and the residue was washed with purified hexane. This procedure was repeated until no chlorine was detected in the supernatant hexane.

The resulting titanium catalyst component contained 1.9 weight % of titanium and 65 weight % of chlorine, both calculated as atom. Then, the titanium catalyst component was subjected to the polymerization described below.

(Polymerization (A) of polypropylene)

A continuous polymerization vessel having an internal volume of 24 liters was continuously supplied with 3 l/hr of dehydrated hexane, 5.9 mmol/hr of triethyl aluminum, 2.1 mmol/hr of methyl p-toluate, and 0.11 mmol/hr, calculated as titanium atom, of the titanium catalyst component that had been synthesized above. Propylene was also continuously fed to the polymerization vessel to carry out the continuous polymerization of propylene at a pressure of about 9 kg/cm$^2$ at a polymerization temperature of 70° C. for an average residence time of about 3 hours. The melt index (MI) of the resulting polypropylene was controlled by feeding hydrogen. As a result, crystalline polypropylene (A) was obtained which had the properties shown in table 1 below.

(Copolymerization (B) of propylene and ethylene)

A 24-liter continuous polymerization vessel was continuously charged with 10 l/hr of dehydrated and purified hexane, 4 mmol/hr of triethyl aluminum, 1.33 mmol/hr of ethyl benzoate, and 0.045 mmol/hr, calculated as titanium atom, of the titanium catalyst component obtained above. Propylene and ethylene were continuously fed to the polymerizer whereby a propylene-ethylene copolymer having the composition shown in table 1 was formed. For the continuous polymerization, the pressure was about 7 kg/cm$^2$, the residence time was about 1 hour, and the polymerization temperature was 60° C. The MI of the resulting copolymer was controlled by feeding H$_2$ continuously. The resulting copolymer had a micro-isotacticity, in accordance with $^{13}$C-NMR, of 0.92 and a boiling cyclohexane insolubles content of 2.3% by weight. Also, the copolymer had a Shore A hardness of 59 and a melting point, in accordance with DSC, of 40° to 70° C. Othe properties of the copolymer are also tabulated in table 1.

(Mixing of the polypropylene and the propylene/ethylene copolymer)

The crystalline polypropylene (A) and propylene/ethylene copolymer (B) obtained above were agitated well by a Henschel mixer, and then subjected to a pelletizer at a temperature of 230° C. to make pellets. The pellets were formed into a 120 cm × 130 cm × 0.2 cm test piece by a molding machine, and the properties of the test piece were measured. The initial flexural modulus (FM) and the gloss were measured in accordance with ASTM-D-790-66, and ASTM-D-523-62T, respectively. The falling dart strength (FD) measured is an impact strength (kg.cm) determined as follows: A dart of a fixed shape was caused to fall from a fixed height onto the test piece laid horizontally at 0° C. With the weight of the dart varied, the falling was repeated until the test piece broke. The energy required for 50% of a fixed number of the test pieces to break was measured, and the impact strength (kg.cm) of the test piece was determined from the results.

TABLE 1

|  | (A) Polypropylene | (B) Propylene/ ethylene copolymer | (A) + (B) Blend polymer | | | (A) + (B) Control blend polymer |
| --- | --- | --- | --- | --- | --- | --- |
| MI (230° C.) | 12.5 | 1.3 | 10 | 9.0 | 7.0 | 3.0 |
| Boiling n-heptane extraction residue (%) | 96.3 | | | | | |
| Propylene content (mol %) | | 61 | | | | |
| (A)/(B) Blend ratio (part by weight) | | | 100/11.1 | 100/17.6 | 100/25 | 100/230 |
| Average FM (kg/cm$^2$ × 10$^{-3}$) | 18.0 | | 14.5 | 12.5 | 11.5 | 0.15 |
| FD (0° C.) (kg · cm) | 6 or less | | 140 | 190 | 190 | 200 or more |
| Gloss | 74 | | 72 | 72 | 70 | 70 |

EXAMPLE 2

(Polymerization (A') of a blend of crystalline polypropylene and polyethylene)

Two continuous polymerization vessels connected in series and having a capacity of 24 liters and 8 liters, respectively, were used in this polymerization. In the first polymerization vessel crystalline polypropylene (boiling n-heptane insolubles content: 94.2 wt%) was polymerized in the same way as in Example 1, whereafter in the second polymerization vessel polyethylene was polymerized, thereby obtaining a chemical blend (MI: 24.1, $C_2''$ content: 8.8 mol%) of crystalline polypropylene and polyethylene. The MI of the polymer to be obtained was controlled by hydrogen, and the amount of polyethylene to be polymerized was adjusted by the amount of ethylene supplied.

A physically blended polymer composition was prepared in the same way as in Example 1 by using the chemical blend (A') of polypropylene and polyethylene obtained above, and a propylene/ethylene copolymer (B') (micro-isotacticity: 0.92, boiling cyclohexane insolubles content: 1.8 wt%, Shore hardness A: 56, melting temperature by DSC: 40°-70° C.) that had been obtained in the same way as in Example 1 except that methyl p-toluate was used instead of ethyl benzoate. Other properties of the polymer composition are shown in Table 2.

TABLE 2

|  | (A') Blend of polypropylene and polyethylene | (B') Propylene/ ethylene copolymer | (A') + (B') Blend polymer |
|---|---|---|---|
| MI (23° C.) | 24.1 | 1.0 | 17.8 |
| Ethylene content (mol %) | 8.8 | 32 |  |
| (A')/(B') Blend ratio (part by weight) |  |  | 100/11.1 |
| Average FM ($kg/cm^2 \times 10^{-3}$) | 16.3 |  | 14.0 |
| FD (0° C.) (kg · cm) | 19 or less |  | 142 |
| Gloss | 51 |  | 52 |

EXAMPLE 3

(Copolymerization of propylene and ethylene)

An autoclave having an internal volume of 30 liters was charged with 20 l of purified hexane and 4 mmol of triethyl aluminum, and the system was heated to 70° C. While passing an ethylene/propylene mixed gas ($C_2''/C_3''$ molar ratio: 40/60) and maintaining the pressure of the system at 5 kg/cm²G, the polymerization was performed for 1 hour with the addition of 0.4 mmol, calculated as titanium atom, of the titanium catalyst obtained in Example 1. After the polymerization was complete, the pressure was reduced and the polymer solution was put in a large amount of methanol for the precipitation of the polymer. As a result, 4,500 g of a propylene/ethylene copolymer (B'') was obtained. Analysis showed that the copolymer had ($\eta$) of 2.98 and a $C_2''$ content of 42.5 mol%. The micro-isotacticity of the copolymer was 0.93, and its boiling cyclohexane insolubles content was 3.6 wt%.

(Preparation of a blend (A'') of polypropylene and polyethylene by polymerization)

The polymerization was carried out in the same manner as in Example 2 to afford a chemical blend (A'') having an MI of 12.7 and a $C_2''$ content of 10.5 mol% and composed of crystalline polypropylene (boiling n-heptane insolubles content: 96.2%) and polyethylene.

The products (A'') and (B'') obtained above were subject to the same procedure as in Example 1 at the ratio 100/11.1 to prepare a physically blended polymer composition. This composition was measured for properties in the same way as in Example 1, whereby it was found that the composition had an average FM of $13.9 \times 10^{-3}$ kg/cm², an FD (0° C.) of 170 kg.cm and a gloss of 53.

EXAMPLE 4

(Copolymerization of propylene and ethylene)

A 24-liter continuous polymerization vessel was continuously fed with 10 l/hr of dehydrated and purified hexane, 2 mmol/hr of tri-isobutyl aluminum, 0.04 mmol/hr, calculated as titanium atom, of the titanium catalyst obtained in Example 1, and 0.15 mmol/hr of methyl p-toluate. The polymerization temperature was 60° C. Propylene and ethylene were continuously fed (the average pressure of the system was 7 kg/cm²G), thereby to obtain a propylene/ethylene copolymer (B) having an ethylene content of 37 mol% and ($\eta$) of 3.10. In this case, hydrogen was not used. The copolymer (B) had a micro-isotacticity of 0.91, a boiling cyclohexane insolubles content of 2.3 wt%, a Shore A hardness of 56, and a melting point or transition point (Tm) by DSC of 40° to 70° C.

(Preparation of a blend (A) of polypropylene and polyethylene by polymerization)

The polymerization was carried out in the same way as in Example 2 to obtain a chemical blend (B) of crystalline polypropylene (boiling n-heptane insolubles content: 96.3 wt%) and polyethylene and having an MI of 6.6 and a $C_2''$ content of 9.2 mol%.

The products (A) and (B) obtained above were blended at the ratio of 100/11.1 in the same way as in Example 1 to prepare a physically blended polymer composition. This composition was measured for properties in the same way as in Example 1, whereby it was found that the composition had an FD (0° C.) of 151 kg.cm, an average FM of $13.0 \times 10^{-3}$ kg/cm², and a gloss of 59.

EXAMPLE 5

An ethylene/oropylene copolymer having a $C_2''$ content of 25 mol% and ($\eta$) of 2.98 was synthesized by repeating the propylene/ethylene copolymerization of Example 4 except that the amount of methyl p-toluate fed was changed to 0.18 mmol/hr and the ratio of propylene to ethylene supplied was also varied. The resulting ethylene/propylene copolymer had a micro-isotacticity of 0.94 and a boiling cyclohexane insolubles content of 2.5 wt%. That copolymer was blended with the chemical blend of crystalline polypropylene and polyethylene obtained in Example 4, the ratio of said copolymer to the blend being 100/11.1, to prepare a physically blended polymer composition. Measurement of its properties showed that the composition had an FD (0° C.) of 134 kg.cm, an average FM of $12.5 \times 10^{-3}$ kg/cm² and a gloss of 64.

EXAMPLE 6

The propylene/ethylene copolymerization of Example 4 was repeated except that methyl p-toluate was not fed, that tri-isobutyl aluminum was used in an amount of 1 mmol/hr, that the titanium catalyst of Example 1 was used in an amount of 0.03 mmol/hr calculated as titanium atom, that the ratio of propylene and ethylene fed was varied, and that the polymerization temperature was changed to 55° C. As a result, a propylene/ethylene copolymer having ($\eta$) of 2.76 and a $C_2''$ content of 58 mol% was obtained. This copolymer had a micro-isotacticity of 0.91, a boiling cyclohexane insolubles content of 2.7 wt%, a Shore A hardness of 87, and a Tm by DSC of 97° C. The copolymer was mixed with the chemical blend of polypropylene and polyethylene obtained in Example 4, the ratio of the copolymer to the chemical blend being 100/11.1, whereby a physically blended polymer composition was prepared. The properties of the composition were as follows:

FD (0° C.)=130 kg.cm. Average FM=13.4×10$^{-3}$ kg/cm². Gloss=50.

Comparative Example 1

The same autoclave as employed in Example 3 was charged with 20 l of hexane, 15 mmol of Al($C_2H_5$)$_2$Cl, and 15 mmol, calculated as titanium atom, of TiCl$_3$AA (a product of Toho Titanium Co., Ltd. sold under the trade name TAC131), and the system was heated to 60° C. While passing an ethylene/propylene mixed gas ($C_2''/C_3''$ molar ratio: 40/60) and hydrogen and maintaining the pressure of the system at 5 kg/cm²G, the polymerization was performed for 12 hours. After the polymerization was complete, the resulting polymer solution was brought into a large amount of methanol for polymer precipitation, thereby obtaining 2,200 g of a propylene/ethylene copolymer. Its analysis showed that the copolymer had ($\eta$) of 2.7, a $C_2''$ content of 52 mol%, a boiling cyclohexane insolubles content of 23 wt%, and a micro-isotacticity of 0.90.

The propylene/ethylene copolymer obtained above was mixed with the chemical blend of crystalline polypropylene and polyethylene obtained in Example 3, at the ratio of 100/11.1, to prepare a blend. Measurement of its properties showed that the blend had an FD (0° C.) of 110 kg.cm, an average FM of 13.6×10$^{-3}$ kg/cm² and a gloss of 36.

What is claimed is:

1. A physically blended propylene polymer composition comprising
    (A) 100 parts by weight of crystalline polypropylene containing 0 to 10 mole% of a member selected from the group consisting of ethylene, another α-olefin, and a mixture thereof,
    (B) 1 to 30 parts by weight of a propylene/ethylene random copolymer composed of 30 to 85 mole% of propylene, said copolymer containing 0 to 10 mole% of a diene component and having (i) a micro-isotacticity of at least 0.8 and (ii) a boiling n-cyclohexane insolubles content of 0 to 10% by weight, said random copolymer being prepared by using a catalyst comprising a carrier-supported solid titanium catalyst component containing magnesium, halogen, titanium and an electron donor, and an organoaluminum compound catalyst component, and
    (C) 0 to 30 parts by weight of polyethylene containing 0 to 15 mole% of an α-olefin, said components (A) and (B) having been physically mixed with each other.

2. The composition of claim 1 wherein said propylene/ethylene random copolymer (B) has an intrinsic viscosity, measured in decalin at 135° C. of 1 to 15.

3. The composition of claim 1 wherein said propylene/ethylene random copolymer (B) has (i) a micro-isotacticity of at least 0.9 and (ii) a boiling n-cyclohexane insolubles content of 0 to 5% by weight.

4. The composition of claim 1 wherein the amount of said propylene/ethylene random copolymer (B) and the amount of said polyethylene (C) are 3 to 20 parts by weight and 0 to 15 parts by weight, respectively, per 100 parts by weight of said crystalline polypropylene (A).

5. The composition of claim 1 wherein said polyethylene (C) has been chemically mixed with said crystalline polypropylene (A).

* * * * *